May 14, 1957 W. F. HORTON ET AL 2,792,547

MAGNETIC AMPLIFIER FOR CONTROL PURPOSES

Filed Nov. 12, 1954 2 Sheets-Sheet 1

WITNESSES

Edwin E. Bassler

John B. Davidson

INVENTORS

William F. Horton, Stanley J. Reisman, Richard O. Decker & Robert A. Ramey.

BY

Paul E. Friedemann

ATTORNEY

May 14, 1957 W. F. HORTON ET AL 2,792,547

MAGNETIC AMPLIFIER FOR CONTROL PURPOSES

Filed Nov. 12, 1954 2 Sheets-Sheet 2

United States Patent Office 2,792,547

Patented May 14, 1957

2,792,547

MAGNETIC AMPLIFIER FOR CONTROL PURPOSES

William F. Horton, Penn Township, Allegheny County, Stanley J. Reisman, Wilkins Township, Allegheny County, Richard O. Decker, Wilkinsburg, and Robert A. Ramey, Bethel Borough, Pa., assignors to Westinghouse Electric Corporation, East Pittsburgh, Pa., a corporation of Pennsylvania Application November 12, 1954, Serial No. 468,462

11 Claims. (Cl. 323—89)

Our invention relates to magnetic amplifier devices and, more particularly, to magnetic amplifiers adapted for use as elements in motor control systems.

Motor control systems of the servo type require that the output voltage applied to the so-called "variable phase" of the usual two-phase motor utilized therein (as opposed to the "fixed phase" of the motor) respond with maximum fidelity to variations of a relatively weak control signal. Generally speaking, the control signal must be considerably amplified to be useful; vacuum tube amplifier systems have been developed which provide both excellent power gain and transient fidelity, but magnetic amplifier development has lagged a pace in this regard. Amplifiers which provide reasonable power gain have been found to have very poor response to variations in the control signal, while magnetic amplifiers having good transient response characteristics usually have only small power gain.

One method that has been suggested for improving the response of magnetic amplifiers has been to utilize negative feedback to stabilize the response with variations in the control signal. The systems that have been utilized in the past have not been particularly successful, affording only limited improvement over the response characteristics obtainable without feedback. In particular, with the systems suggested heretofore, it has not been feasible to adjust the gain of the amplifier without unduly affecting the response thereof.

An object of our invention is to provide a motor control system utilizing magnetic amplifiers wherein the gain of the system may be adjusted without deleteriously affecting the time response thereof.

Another object of our invention is to provide a motor control system utilizing magnetic amplifiers wherein there is obtained faithful response of the output voltage to variations of the control signal.

Still another object is to provide an adjustable feedback system for a self-saturating magnetic amplifier that will afford improved operation with smaller and less expensive component parts than previously known.

A further object is to provide a self-saturating magnetic amplifier having minimum output voltage and null point variations with variations in ambient temperature and in the amplitude and frequency of the supply voltage.

Yet another object is to provide a self-saturating magnetic amplifier having a nearly sinusoidal output voltage phase shifted 90 electrical degrees from the amplifier A.-C. supply voltage.

A still further object is to provide an amplifier whose output voltage is largely independent of load variations.

In one aspect of our invention, a self-saturating type magnetic amplifier having direct current output is coupled to the control winding of a self-saturating magnetic amplifier having alternating current output through a resistor connected in series with the control winding. The voltage across the resistor is applied to a feedback winding of the first magnetic amplifier through a T-connected resistance-capacitance network having a shunt capacitor and series resistors, the feedback winding being series-connected with the control winding of the first amplifier to provide additional feedback ampere turns without increasing the size of the magnetic circuit thereof. The alternating voltage output of the second magnetic amplifier is applied to feedback windings on the second amplifier through a phase-shifting network, the values of the constants of which are chosen so that the voltage across the feedback winding is in phase with the alternating supply voltage applied to the load windings of the amplifier. It has been found that when this relationship is obtained, the output voltage follows variations in the signal applied to the control winding with maximum fidelity.

A feature of our invention is the manner of coupling the output signal to the load through a transformer having a single secondary winding and a plurality of primary windings, one for each of the load windings involved in the circuit. It has been found in a conventional type of self-saturating magnetic amplifier, such as illustrated and described in U. S. Patent No. 2,126,790 to F. C. Logan, that a back voltage produced by the collapsing magnetic field across the load winding through which no current is flowing on a given half cycle of the supply voltage detrimentally affects the response characteristic of the amplifier by virtue of the circulating currents that are thereby set up in the closed circuit including the load windings and the half-wave rectifiers associated therewith. Insertion of a primary winding of an output transformer in series with each of the load windings of the magnetic amplifier effectively reduces the magnitude of the circulating currents, and has been found to substantially increase the fidelity of the response of the magnetic amplifier.

Other objects and features of our invention will become apparent upon a study of the following detailed description thereof when taken in connection with the accompanying drawings, wherein:

Figure 1 is a schematic diagram of a basic type of magnetic amplifier utilized in our invention;

Fig. 2*a* is a hysteresis loop useful in explaining the operation of the magnetic amplifier shown in Fig. 1;

Fig. 2*b* is a curve of output voltage as a function of control ampere turns of the magnetic amplifier of Fig. 1 useful in explaining the operation thereof;

Figure 1:
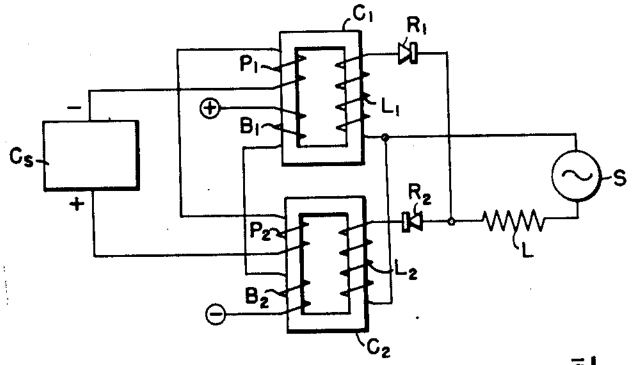

The basic magnetic amplifier circuit here under consideration is shown in Fig. 1. It consists of an alternating current power supply S, two reactors each having a ferromagnetic core ($C_1$, $C_2$), a load winding on each of said cores respectively designated $L_1$ and $L_2$, one or more control windings, and a self-saturating rectifier in series with each of the load windings ($R_1$, $R_2$). A full-wave bridge rectifier may be inserted in the load circuit where it is desired to produce a direct current load current. As shown, each of the reactors has two control windings, one being a bias winding ($B_1$, $B_2$) which sets an ambient control magnetomotive force in the core with which it is associated with no current flowing through the other windings on the core, and a pattern winding ($P_1$, $P_2$) which varies the ambient magnetomotive force in accordance with the magnitude and direction of flow of a control current flowing through load L will flow through one of the core from saturation in a given sense at a given rate. The self-saturating rectifiers are poled so that alternating current flowing through load L will flow through one of the rectifiers and the load winding associated therewith on alternate half cycles of alternating current source S.

Figure 2A:
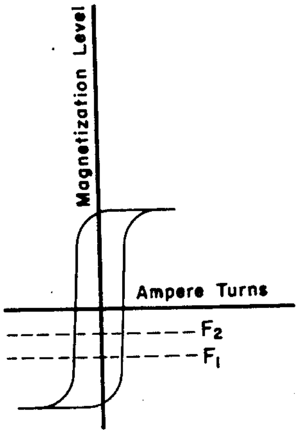
Figure 2B:
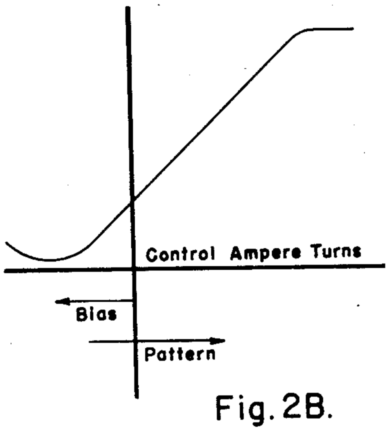

On given first alternate half cycles of the supply source S, core $C_1$ will be driven to saturation by the supply current, and the pattern windings on core $C_2$ will be resetting the flux level thereof to a value determined by the average current through the pattern windings over that half cycle. On given second alternate half cycles, core $C_2$ will be driven to saturation and the magnetization level of core $C_1$ will be reset to a value determined by the average control current through the pattern windings thereof during the half cycle. During a half cycle on which a particular core is being driven to saturation, substantially the entire supply voltage will appear across the load winding associated therewith until saturation is reached, and will thereafter appear across the load. The portion of a half cycle required for a core to be driven to saturation is dependent upon the flux level set by current in the pattern winding during the immediately preceding half cycle, and thus the average voltage appearing across the load will be be similarly dependent. By increasing the ampere turns produced by the pattern winding current so as to lessen the extent to which the flux level of a given core is withdrawn from saturation on half cycles over which no current is flowing through the load winding thereof, the output voltage appearing across the load may be increased; this relationship is shown in Fig. 2b. It is evident that feedback windings may be placed on the cores, the current through which may be made proportional to the output voltage; if an increase in feedback winding current as a result of an increase in output voltage brings about a flux change cumulative with the flux produced by current in the bias winding, inverse feedback is achieved which may be used to stabilize the output voltage.

Figure 3:
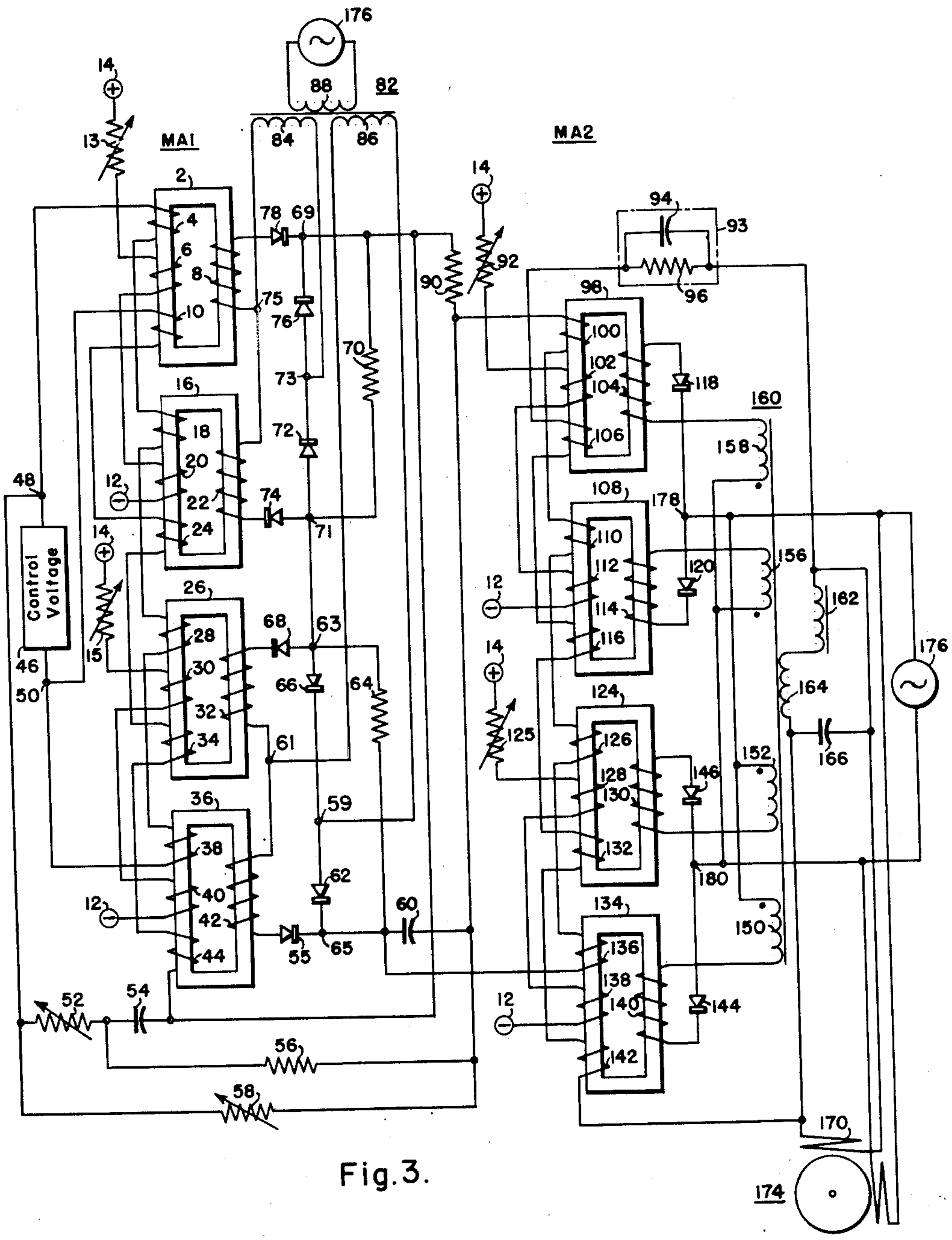
Fig. 3 is a schematic diagram of an embodiment of our invention.

With reference now to Fig. 3, reference numeral 46 designates a control voltage source which may be any signal source ordinarily utilized to control a servomotor, such as demodulated voltage derived from a synchro control transformer or the difference voltage derived from a resistance bridge being excited from a D. C. potential. This voltage is the control voltage of source 46.

Magnetic amplifier MA1 has two sections, one utilizing cores 2 and 16, and the other utilizing cores 26 and 36. Each section is a self-saturating magnetic amplifier of the type generally described above. Cores 2, 16, 26 and 36 are respectively provided with load windings 8, 22, 32, and 42, control windings 4, 18, 28, and 38, bias windings 6, 20, 30, and 40, and feedback windings 10, 24, 34, and 44 wound in inductive relation thereon. The bias windings 6, 20, 30, and 40 are respectively serially connected with current adjusting resistors 13 and 15 respectively across a constant potential direct current source (not shown) having positive and negative output terminals 14 and 12.

Control windings 4, 18, 28, and 38 are serially connected across output terminals 48 and 50 of control voltage source 46. Windings 4 and 18 are wound so that the flux produced thereby opposes the flux of the bias windings associated therewith when terminal 48 is positive with respect to terminal 50, and windings 28 and 38 are wound so that the flux produced thereby is cumulative with the flux produced by the bias windings associated therewith when terminal 48 is positive with respect to terminal 50.

Supply voltage for the pattern windings is derived from a power transformer 82, the primary of which is connected to a source of alternating current 176, one secondary winding 84 of the transformer being coupled to load windings 8 and 22, and the other secondary winding 86 of which is coupled to load windings 32 and 42.

Rectifiers 74 and 68 are respectively inserted in series with load windings 22 and 32, so that current will flow therethrough on one half cycle of the alternating current source, and half-wave rectifiers 78 and 55 are inserted in series with load windings 8 and 42, so that the current will flow therethrough on the other half cycle of the source. Rectifiers 76 and 72 are coupled across the output terminals 71 and 69 in series so that, in combination with load windings 8 and 22 and their associated self-saturating rectifiers 78 and 74, a bridge rectifier is formed, the input terminals 75 and 73 of which are connected to the terminals of winding 84. Likewise, serially-connected half-wave rectifiers 66 and 62 connected between output terminals 63 and 65 of the other section of the magnetic amplifier so that, in combination with load windings 32 and 42 and their associated self-saturating rectifiers 68 and 55, a bridge rectifier is formed, the input terminals 61 and 59 of which are connected to the terminals of winding 86. Output terminals 71 and 63 are connected together, and resistors 64 and 70 are respectively connected to output terminal pairs 65, 63, and 71, 69.

Load windings 8, 22, 32, and 42 are wound on their respective cores 2, 16, 26, and 36 so that the flux produced thereby opposes the flux produced by the bias windings 6, 20, 30, and 40 respectively associated therewith.

The feedback windings 44, 34, 24, and 10 are serially connected in the order named and are further serially connected with the control windings 38, 28, 18, and 4, so that the current will flow successively through windings 44, 34, 24, 10, 38, 28, 18, and 4.

Figure 4:
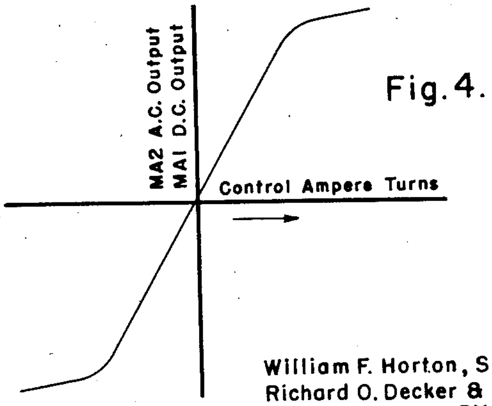
Fig. 4 is a curve of output voltage as a function of control ampere turns of an embodiment of our invention.

When the output voltage of control voltage source 46 is such that terminal 48 is positive with respect to terminal 50, the section of magnetic amplifier MA1 including cores 2 and 16 will produce an average output voltage functionally related to the current through pattern windings 4 and 18, inasmuch as the current is effective in driving cores 4 and 18 toward saturation on reset half cycles thereof. The section of magnetic amplifier MA1 including cores 26, 36 will produce less output voltage across resistor 64, inasmuch as the pattern current is effective to drive cores 26, 36 away from saturation, toward the cut-off region of its characteristic. Therefore, the output voltage is the difference between the voltages across resistors 70 and 64 and is of a polarity such that terminal 69 is positive with respect to terminal 65. Similarly, reversal of the polarity of the output of control voltage source 46 will be effective to reverse the polarity of the output voltage across terminals 69, 65, as shown in Fig. 4.

That part of the output voltage appearing across resistor 90 is applied to the feedback windings and pattern windings connected as described above through a T-network including series resistors 56 and 52 and shunt capacitor 54, one terminal of which is connected to the junction of resistors 56 and 52. Additionally, resistor 58 is connected in parallel with serially-connected resistors 56 and 52. This network provides a delayed negative feedback signal from the voltage appearing across resistor 90 to MA1. The response of the amplifier to changes in control voltages is enhanced and the stability of the amplifier improved by virtue of the negative feedback provided under static signal conditions. Further, since the voltage appearing across resistor 90 is in phase with the current through the pattern windings of magnetic amplifier MA2, it will lag the output voltage of magnetic amplifier MA1 appearing across terminals 69, 65, thus providing additional time delay to the feedback signal. It has been found that by delaying the feedback signal in the manner described above, the response of the amplifier is considerably improved over that obtained without delay and without feedback.

The time constant of the T-connected feedback network is given by the equation:

$$\frac{R_1 R_2}{R_1+R_2}C$$

where $R_1$ is the resistance of resistor 56, $R_2$ is the resistance of resistor 52, and C is the capacitance of capacitor 54. It will be noted that the steady state gain of the amplifier will be a function of the sum of resistors 52 and 56. By making the value of resistor 52 equal to several times the resistance of resistor 56, the parallel combination of the two resistors will be relatively unchanged by variations in resistor 52; however, the gain of the magnetic amplifier may be readily adjusted by the variations in resistor 52.

Magnetic amplifier MA2 is an alternating current output device, the magnitude of the output voltage of which is controlled by the direct current output voltage across terminals 69, 65. This magnetic amplifier also has two sections, one including magnetic cores 98, 108 and the other including magnetic cores 124, 134. Cores 98, 108, 124, 134 respectively have wound thereon: pattern windings 100, 110, 126, 136; bias windings 102, 112, 128, 138; load windings 104, 114, 130, 140; and feedback windings 106, 116, 132, 142. Bias windings 102 and 112 are serially connected with resistor 92 across bias terminals 12, 14; likewise, bias windings 128 and 138 are serially connected with resistor 125 across terminals 12, 14. Resistor 90 and pattern windings 100, 110, 126, and 136 are serially connected in the order named across output terminals 69, 65 of magnetic amplifier MA1. The pattern windings are wound on their respective cores so that windings 100 and 110 produce flux which opposes that produced by their respective bias windings, and windings 126 and 136 produce flux which aids that produced by their respective bias windings with terminal 69 positive with respect to terminal 65. Capacitor 60, which shunts the pattern windings of MA2, improves amplifier gain and symmetry by filtering the pulsed output of MA1.

Self-saturating rectifiers 118, 120, 146, and 144 are respectively connected in series with load windings 104, 114, 130, and 140. An output transformer 160 having a single secondary winding 164 and primary windings 150, 152, 156, and 158 is provided, the primary windings being connected in the order named in series with load windings 140, 130, 114, and 104. Alternating current source 176 (the same source as that coupled to primary 88 of transformer 82) having output terminals 178 and 180 is provided; output terminal 178 is connected to the free terminals of windings 152 and 150, while terminal 180 is connected to the free terminals of windings 156, 158. Terminal 178 is further connected to self-saturating rectifiers 118 and 120, while terminal 180 is connected to self-saturating rectifiers 146 and 144. The polarity of the half-wave rectifiers is such that current will flow through windings 114 and 130 on one half cycle of source 176 and through windings 104 and 140 on the other half cycle.

The load windings 104, 114, 130 and 140 are wound on their respective cores so that the flux produced thereby is in opposition to that produced by their respective bias windings.

Control winding 170 of servomotor 174 is coupled to secondary winding 164 of transformer 160 through a low pass L-C filter circuit including reactor 162 and capacitor 166. This L-C circuit should be such as to pass output signals from secondary winding 164 of the same frequency as that of source 176 with substantially zero attenuation and to severely attenuate harmonic frequencies thereof.

Feedback windings 106, 116, 132, and 142 are serially connected in the order named and are coupled across control winding 170 through a phase-shifting network 93 including parallel-connected capacitor 94 and resistor 96. The function of the phase-shifting network is to shift the phase of the voltage applied to the feedback winding so that it is substantially 180° out of phase with the supply voltage at output of source 176. It has been found that when this relationship is obtained, a negative feedback condition is achieved and the response of magnetic amplifier MA2 to transient signals imposed on the pattern windings thereof is optimum.

With the output voltage from magnetic amplifier MA1 of such a polarity that terminal 69 is positive with respect to terminal 65, the section of magnetic amplifier MA2 including cores 98 and 108 will produce output current flow through transformer primaries 158, 156, while the section including cores 124, 134 will be driven toward cut-off. An alternating output voltage across the transformer secondary winding 164 is filtered by reactor 162 and capacitor 166 to remove harmonics of the supply voltage, and is applied to the feedback windings of amplifier MA2 through phase-shifting network 93. When the polarity of the output of control voltage source 46 is reversed, there is a phase shift of 180° in the output voltage appearing across capacitor 166. Additionally, by virtue of transformer 160 and L-C filter 162, 166, the voltage across the variable phase 170 of motor 174 is 90° out of phase with the supply voltage of source 176, which supply voltage is also applied to the motor's fixed phase winding 172. Therefore, the direction of rotation of motor 174 is governed by the polarity of the direct current voltage output of control source 46. The static response of MA2 is shown in Fig. 4.

As has been mentioned, it has been found that by shifting the sinusoidal voltage appearing across capacitor 166 by another 90° and applying the resulting voltage to the feedback windings of amplifier MA2 so that it is 180° out of phase with the supply voltage, the fidelity of the response and stability are considerably improved. This is accomplished without demodulation of the feedback voltage, considerably reducing the complexity and cost of the amplifier. This feedback scheme provides the additional advantage of making the output of MA2 relatively independent of running or stalled impedance of motor 174.

It is to be understood that the specific embodiment of the invention shown and described is but illustrative, and that various modifications may be made therein without departing from the scope and spirit of this invention.

We claim as our invention:

1. In an electrical control system, the combination comprising: a push-pull self-saturating magnetic amplifier having two sections, each section of said push-pull magnetic amplifier including magnetic cores, a control winding responsive to a control signal source and disposed in inductive relationship with the respective magnetic core means and a power winding disposed in inductive relationship with the respective magnetic cores, a transformer having a secondary winding and a plurality of primary windings therein corresponding in number to said power windings; each of said power windings being serially connected with an individual one of said primary windings, and unilateral conduction means serially connected with each of said power windings and the respective primary winding associated therewith polarized to permit current conduction through one of the power windings in each of said sections and the respective primary winding associated therewith on first alternate half cycles of an alternating current source connected thereto and through the other of said power windings in each of said sections and the respective primary windings associated therewith on second alternate half cycles.

2. In an electrical control system, the combination comprising: a push-pull saturable reactor having two sections, each section of the push-pull saturable reactor including magnetic core means, a control winding responsive to a control signal source and disposed in inductive relationship with the respective magnetic core means and a power winding disposed in inductive relationship with the respective magnetic core means, a transformer having a secondary winding and a plurality of primary windings therein; each of said power windings being serially connected with one of said primary windings, and unilateral conduction means serially connected with each of said power windings and the respective primary winding associated therewith polarized to permit current conduction through one of said power windings on first alternate half cycles of an alternating current source connected thereto and through the other of said power windings and the respective primary windings associated therewith on second alternate half cycles; a driver magnetic amplifier, including negative feedback windings for stabilizing the output voltage thereof, coupled to said control windings through resistance means in series circuit relationship with said control windings; a negative feedback circuit including said negative feedback windings coupled to said resistance means by a T-circuit including first and second series resistances and a shunt capacitor connected to the mid-point thereof.

3. A self-saturating amplifier comprising: first and second saturable magnetic core means; control winding means disposed on each of said magnetic core means adapted to vary the magnetization level thereof in accordance with a control signal coupled thereto, bias winding means disposed on each of said magnetic core means adapted to set the magnetization level of each of the respective cores to a predetermined level with no current flowing through other winding means associated therewith; load winding means disposed on each of said magnetic core means; a transformer having secondary winding means and a plurality of primary widings at least corresponding in number to said power windings; each of said power windings being serially connected to an individual one of said primary windings; and unilateral conduction means in series with each of said power windings and the primary winding associated therewith, said unilateral conduction means being so polarized that said first and second magnetic core means will be driven to saturation in alternation by an alternating current supply source connected thereto.

4. A self-saturating magnetic amplifier comprising: first and second saturable magnetic core means; a control signal source; control winding means disposed on each of said magnetic core means adapted to vary the magnetization level thereof in accordance with a control signal, said control signal source being coupled thereto, bias winding means disposed on each of said magnetic core means adapted to set the magnetization level of each of the respective cores to a predetermined level with no current flowing through other winding means associated therewith; power winding means disposed on each of said magnetic core means; a transformer having secondary winding means and a plurality of primary windings at least corresponding in number to said power winding means; each of said power windings being serially connected to an individual one of said primary windings; and unilateral conduction means in series with each of said power windings and the primary winding associated therewith, said unilateral conduction means being so polarized that said first and second magnetic core means will be driven to saturation in alternation by an alternating current supply source connected thereto to produce an alternating voltage signal across the secondary winding means of said transformer.

5. A self-saturating amplifier comprising: first and second saturable magnetic core means; a control signal source; control winding means disposed on each of said magnetic core means adapted to vary the magnetization level thereof in accordance with a control signal, said control signal source being coupled thereto, bias winding means disposed on each of said magnetic core means adapted to set the magnetization level of each of the respective cores to a predetermined level with no current flowing through other winding means associated therewith; power winding means disposed on each of said magnetic core means; a transformer having a secondary load winding and a plurality of primary windings; each of said power windings being serially connected to one of said primary windings; and unilateral conduction means in series with each of said power windings and the primary winding associated therewith, said unilateral conduction means being so polarized that said first and second magnetic core means will be driven to saturation in alternation by an alternating current supply source connected thereto, said primary windings being energized in alternation so as to produce an alternating output voltage across said secondary load winding, filter means connected to said load winding adapted to attentuate harmonics of said alternating current coupled to said load windings, degenerative feedback windings disposed on said first and second magnetic core means, and means coupling the output of said filter means to said feedback windings in 180° phase relationship with said alternating supply current.

6. A magnetic amplifier comprising: first magnetic core means; first control winding means on said first magnetic core means adapted to withdraw said first core means from saturation at a rate functionally related to the magnitude of control current therethrough, load winding means on said first magnetic core means; rectifier means and alternating supply voltage means in circuit relationship with said first magnetic core means adapted to produce a direct output voltage functionally related to the magnitude of said control current; second magnetic core means; second control winding means in inductive relationship with said second magnetic core means adapted to set the flux level thereof at a predetermined value in accordance with the magnitude of current passing therethrough; load winding means on said second control winding means coupled to said alternating supply voltage means by half-wave rectifier means so that the average current therefrom is functionally related to the ambient flux level produced by said second control winding means; feedback winding means on said second magnetic core means coupled to said load winding means by means adapted to shift the voltage applied thereto by 180 degrees with respect to the alternating voltage of said supply voltage means, a resistor coupling said direct output voltage to said second control winding means, second feedback winding means on said first magnetic core means, and coupling means coupling the voltage across said resistor to said second feedback winding means so as to oppose the effect on said direct output voltage of current passing through said first control winding means.

7. A magnetic amplifier comprising: first magnetic core means; first control winding means on said first magnetic core means adapted to withdraw said first core means from saturation at a rate functionally related to the magnitude of control current therethrough, load winding means on said first magnetic core means; rectifier means and alternating supply voltage means in circuit relationship with said first magnetic core means adapted to produce a direct output voltage functionally related to the magnitude of said control current; second magnetic core means; second control winding means in inductive relationship with said second magnetic core means adapted to set the flux level thereof at a predetermined value in accordance with the magnitude of current passing therethrough; load winding means on said second control winding means coupled to said alternating supply voltage means by half-wave rectifier means so that the average current therefrom is functionally related to the ambient flux level produced by said second control winding means; feedback winding means on said second magnetic core means coupled to said load winding means by means adapted to shift the voltage applied thereto by 180 degrees with respect to the alternating voltage of said supply voltage means, a resistor coupling said direct output voltage to said second control winding means, second feedback winding means on said first magnetic core means, and coupling means coupling the voltage across said resistor to said second feedback winding means so as to oppose the effect on said direct output voltage of current passing through said first control winding means, said coupling means including a T-network comprising two serially-connected resistor elements and a shunt capacitor connected to the midpoint of said resistance elements.

8. A magnetic amplifier comprising: first magnetic core means; first control winding means on said first magnetic core means adapted to withdraw said first core means from saturation at a rate functionally related to the magnitude of control current therethrough, load winding means on said first magnetic core means; rectifier means and alternating supply voltage means in circuit relationship with said first magnetic core means adapted to produce a direct output voltage functionally related to the magnitude of said control current; second magnetic core means; second control winding means in inductive relationship with said second magnetic core means adapted to set the flux level thereof at a predetermined value in accordance with the magnitude of current passing therethrough; load winding means on said second control winding means coupled to said alternating supply voltage means by half-wave rectifier means so that the average current therefrom is functionally related to the ambient flux level produced by said second control winding means; feedback winding means on said second magnetic core means coupled to said load winding means by means adapted to shift the voltage applied thereto by 180 degrees with respect to the alternating voltage of said supply voltage means, a resistor coupling said direct output voltage to said second control winding means, second feedback winding means on said first magnetic core means, and coupling means coupling the voltage across said resistor to said second feedback winding means so as to oppose the effect on said direct output voltage of current passing through said first control winding means, said coupling means including a T-network comprising two serially-connected resistor elements and a shunt capacitor connected to the midpoint of said resistance elements, one of said resistance elements having at least three times the resistance of the other.

9. In an electrical control system, the combination comprising: a first push-pull self-saturating magnetic amplifier having two sections; each section of said magnetic amplifier including a pair of magnetic cores; control winding means responsive to a control signal to withdraw cores of one of said sections from saturation at a rate functionally related to the magnitude of said control signal and disposed in inductive relationship with the magnetic cores, a power winding disposed in inductive relationship with each of the respective magnetic core means; a transformer having a secondary winding and a plurality of primary windings thereon; a unilateral conduction means coupled to each of said power windings and adapted to couple a source of alternating current to each of said power windings through the primary winding associated therewith so that the magnetic cores of each of said sections are driven toward saturation on alternate half-cycles of said alternating current source and so that conduction of the saturation through said load windings of each section will produce an alternating voltage signal across said secondary winding; filter means adapted to attenuate harmonics of the fundamental frequency of said alternating current source; feedback winding means in inductive relationship with said magnetic cores, and means including said filter means coupling said secondary winding to said feedback windings adapted to produce flux variations in said magnetic core means in 180 degree phase relationship to flux variations produced by said current in said power windings.

10. In an electrical control system, the combination comprising: a first push-pull self-saturating magnetic amplifier having two sections; each section of said magnetic amplifier including a pair of magnetic cores; control winding means responsive to a control signal to withdraw cores of one of said sections from saturation at a rate functionally related to the magnitude of said control signal and disposed in inductive relationship with the magnetic cores, a power winding disposed in inductive relationship with each of the respective magnetic core means; a transformer having a secondary winding and a plurality of primary windings thereon; a unilateral conduction means coupled to each of said power windings and adapted to couple a source of alternating current to each of said power windings through the primary winding associated therewith so that the magnetic cores of each of said sections are driven toward saturation on alternate half-cycles of said alternating current source and so that conduction of the saturation through said load windings of each section will produce an alternating voltage signal across said secondary winding; filter means adapted to attenuate harmonics of the fundamental frequency of said alternating current source; feedback winding means in inductive relationship with said magnetic cores, and means including said filter means coupling said secondary winding to said feedback windings adapted to produce flux variations in said magnetic core means in 180 degree phase relationship to flux variations produced by said current in said power windings, a second push-pull, self-saturating magnetic amplifier having two sections; each section of said second amplifier including a pair of magnetic cores and a load winding disposed in inductive relationship with each of said cores; unilateral conduction means coupling said alternating current source to each of said load windings through load resistance means adapted to drive the magnetic cores in each of said sections of said second amplifier in alternation and to produce a direct voltage across said load resistance in accordance with the polarity of a control voltage applied to control windings in inductive relationship with said cores of said second amplifiers, first resistor means in series with said control winding means of said first amplifier coupling the output voltage of said first amplifier appearing across said load resistor to said control windings of said second amplifier, feedback windings in inductive relationship with said magnetic cores of said second section coupled to said resistor means through a delay network so as to provide inverse feedback for said second amplifier.

11. In an electrical control system, the combination comprising: a first push-pull self-saturating magnetic amplifier having two sections; each section of said magnetic amplifier including a pair of magnetic cores; control winding means responsive to a control signal to withdraw cores of one of said sections from saturation at a rate functionally related to the magnitude of said control signal and disposed in inductive relationship with the magnetic cores, a power winding disposed in inductive relationship with each of the respective magnetic cores; a transformer having a secondary winding and a plurality of primary windings thereon; a unilateral conduction means coupled to each of said power windings and adapted to couple a source of alternating current to each of said power windings through the primary winding associated therewith so that the magnetic cores of each of said sections are driven toward saturation on alternate half-cycles of said alternating current source and so that conduction of the saturation through said load windings of each section will produce an alternating voltage signal across said secondary winding; filter means adapted to attenuate harmonics of the fundamental frequency of said alternating current source; feedback winding means in inductive relationship with said magnetic cores, and means including said filter means coupling said secondary winding to said feedback windings adapted to produce flux variations in said magnetic cores in 180 degree phase relationship to flux variations produced by said current in said power windings, a second push-pull, self-saturating magnetic amplifier having two sections; each section of said second amplifier including a pair of magnetic cores and a load winding disposed in inductive relationship with each of said cores; unilateral conduction means coupling said alternating current source to each of said load windings through load resistance means adapted to drive the magnetic cores in each of said sections of said second amplifier in alternation and to produce a direct voltage across said load resistance in accordance with the polarity of a control voltage applied to control windings in inductive relationship with said cores of said second amplifiers, first resistor means in series with said control windings of said first amplifier coupling the output voltage of said first amplifier appearing across said load resistor to said control windings of said second amplifier, feedback windings in inductive relationship with said magnetic cores of said second section coupled to said resistor means through a delay network so as to provide inverse feedback for said second amplifier, said delay network comprising second and third resistance means serially connected between said first resistor means and said feedback windings and a shunt capacitor connected to the junction of said second and third resistor means, said third resistor means being variable and at least three times the resistance of said second resistor means.

References Cited in the file of this patent

Publication entitled "Grundlagen der magnetischen Verstar Ker fur die Mess-und Regeltechnik," by Wilhelm Geyger, April 20, 1940, pp. 246–268, pp. 261 and 262 pertinent.